(12) United States Patent
Bauerle et al.

(10) Patent No.: US 9,043,266 B2
(45) Date of Patent: May 26, 2015

(54) UNIFIED INTERACTIVE DATA ANALYSIS SYSTEM

(75) Inventors: Lars Bauerle, Somerville, MA (US);
Tobias Lehtipalo, Västra Frölunda (SE);
Magnus Thorsell, Gothenburg (SE);
Johan Hergens, Gothenburg (SE);
Tommy Fortes, Göteborg (SE)

(73) Assignee: TIBCO Software Inc., Palo Alto, CA (US)

( * ) Notice: Subject to any disclaimer, the term of this patent is extended or adjusted under 35 U.S.C. 154(b) by 880 days.

(21) Appl. No.: 11/361,697

(22) Filed: Feb. 24, 2006

(65) Prior Publication Data
US 2007/0203902 A1 Aug. 30, 2007

(51) Int. Cl.
*G06Q 30/02* (2012.01)
*G06F 17/30* (2006.01)

(52) U.S. Cl.
CPC .......... *G06Q 30/02* (2013.01); *G06F 17/30017* (2013.01); *G06F 17/30592* (2013.01)

(58) Field of Classification Search
USPC ................................ 707/600–603, 798, 612
See application file for complete search history.

(56) References Cited

U.S. PATENT DOCUMENTS

| | | | | |
|---|---|---|---|---|
| 5,799,300 | A * | 8/1998 | Agrawal et al. | 707/5 |
| 5,822,751 | A * | 10/1998 | Gray et al. | 707/3 |
| 5,832,475 | A * | 11/1998 | Agrawal et al. | 707/2 |
| 5,890,151 | A * | 3/1999 | Agrawal et al. | 707/5 |
| 5,926,820 | A * | 7/1999 | Agrawal et al. | 707/200 |
| 6,014,661 | A * | 1/2000 | Ahlberg et al. | 707/3 |
| 6,075,530 | A * | 6/2000 | Lucas et al. | 715/804 |
| 6,330,564 | B1 * | 12/2001 | Hellerstein et al. | 707/101 |
| 6,430,565 | B1 * | 8/2002 | Berger et al. | 707/101 |
| 6,442,560 | B1 * | 8/2002 | Berger et al. | 707/102 |
| 6,446,059 | B1 * | 9/2002 | Berger et al. | 707/2 |
| 6,480,194 | B1 * | 11/2002 | Sang'udi et al. | 345/440 |
| 6,707,454 | B1 * | 3/2004 | Barg et al. | 345/440 |
| 6,842,176 | B2 * | 1/2005 | Sang'udi et al. | 345/440 |
| 6,941,311 | B2 * | 9/2005 | Shah et al. | 707/101 |
| 6,947,951 | B1 * | 9/2005 | Gill | 707/104.1 |
| 6,980,980 | B1 * | 12/2005 | Yeh | 707/2 |
| 6,996,554 | B2 * | 2/2006 | Kotsis et al. | 707/2 |
| 7,051,025 | B2 * | 5/2006 | Kan et al. | 707/6 |
| 7,089,266 | B2 * | 8/2006 | Stolte et al. | 707/104.1 |
| 7,373,612 | B2 * | 5/2008 | Risch et al. | 715/850 |
| 7,506,274 | B2 * | 3/2009 | Zhang et al. | 715/854 |
| 2003/0187716 | A1 * | 10/2003 | Lee | 705/10 |
| 2004/0064436 | A1 * | 4/2004 | Breslin et al. | 707/1 |

(Continued)

OTHER PUBLICATIONS

Wang, M. and B. Iyer "Efficient Roll-Up and Drill-Down Analysis in Relational Databases", Proceedings of the 1997 SIGMOD Workshop on Research Issues on Data Mining and Knowledge Discovery, 1997.*

(Continued)

*Primary Examiner* — Alexey Shmatov
(74) *Attorney, Agent, or Firm* — Kristofer E. Elbing

(57) ABSTRACT

A system for analyzing data from a data set is disclosed. The system includes analysis logic responsive to a dimensional analysis control and an attribute analysis control for the same data. This logic can incrementally update the state of a data presentation from an existing state to a new state, and then remain responsive in the new state to further user input via the dimensional data analysis control and further user input via the attribute analysis control to further incrementally update the presentation.

45 Claims, 18 Drawing Sheets

(56) References Cited

U.S. PATENT DOCUMENTS

| | | | |
|---|---|---|---|
| 2004/0064456 A1* | 4/2004 | Fong et al. | 707/100 |
| 2004/0090472 A1* | 5/2004 | Risch et al. | 345/853 |
| 2004/0193598 A1* | 9/2004 | Kan et al. | 707/6 |
| 2004/0243593 A1* | 12/2004 | Stolte et al. | 707/100 |
| 2005/0010566 A1* | 1/2005 | Cushing et al. | 707/3 |
| 2005/0038630 A1* | 2/2005 | Verschell et al. | 702/182 |
| 2005/0038767 A1* | 2/2005 | Verschell et al. | 707/1 |
| 2005/0060300 A1* | 3/2005 | Stolte et al. | 707/3 |
| 2005/0091263 A1* | 4/2005 | Wallace | 707/102 |
| 2005/0172007 A1* | 8/2005 | Avrahami et al. | 709/219 |
| 2005/0262120 A1* | 11/2005 | Shoup et al. | 707/100 |
| 2006/0031209 A1* | 2/2006 | Ahlberg et al. | 707/3 |
| 2006/0206512 A1* | 9/2006 | Hanrahan et al. | 707/102 |
| 2007/0192338 A1* | 8/2007 | Maier et al. | 707/100 |
| 2008/0270946 A1* | 10/2008 | Risch et al. | 715/848 |
| 2009/0006318 A1* | 1/2009 | Lehtipalo et al. | 707/2 |
| 2009/0006319 A1* | 1/2009 | Lehtipalo et al. | 707/2 |

OTHER PUBLICATIONS

Spotfire "What's Coming in Spotfire® DecisionSite™ 8.1.1", downloaded from www.spotfire.com, Apr. 2005.*

Reid, H. "DecisionSite™ by Spotfire, Seeing is Believing", Directions Magazine, Sep. 28, 2005.*

* cited by examiner

UNIFIED INTERACTIVE DATA ANALYSIS SYSTEM

FIELD OF THE INVENTION

This invention relates to the field of data analysis, including the design of data analysis and visualization systems.

BACKGROUND OF THE INVENTION

The modern world is seemingly flooded with data but is often at a loss for interpreting it. One exceptionally useful tool that has found wide acceptance is software that presents the data in some visual form, especially in a way that makes relationships noticeable. Using this software, often very complex databases can be queried. The results of the queries are then analyzed and displayed in some visual format, usually graphical, such as a bar or pie chart, scatter plot, or any of a large number of other well-known formats. Modern analysis tools then allow the user to dynamically adjust the ranges of the displayed results in order to change and see different aspects of the analysis.

One prominent data visualization product is owned by Spotfire AB of Göteborg, Sweden, and marketed under the name DecisionSite.® In this product, which incorporates the technology disclosed in U.S. Pat. No. 6,014,661, query devices tied to columns in the data set and different visualizations of the data allow users to dynamically filter their data sets based on any available property, and hence to interactively visualize the data. As the user adjusts graphical query devices such as rangesliders and alphasliders, the DecisionSite product changes the visualization of the data accordingly.

The DecisionSite product also includes several other automatic features, such as initial selection of suitable query devices and determination of ranges, which aid the user not only to visualize the data, but also to mine it. When properly used, this technique constitutes a powerful tool that forms the basis for sophisticated data exploration and decisionmaking applications.

Overall, analysis and visualization products have improved the efficiency and enhanced the capabilities of professionals in a wide range of areas of data analysis. But these individuals are typically highly trained and highly paid, and they can still spend long periods of time in their data analysis tasks. Improvements in capabilities of data analysis tools could therefore bring further improvements to the efficiency and quality of tasks performed by individuals working in a variety of fields.

SUMMARY OF THE INVENTION

In one general aspect, the invention features a system for analyzing data from a data set. The system includes a dimensional analysis control that is responsive to user input to navigate dimensionally organized data in the data set according to its dimensional organization. The system also includes an attribute analysis control responsive to user input to analyze the data in the data set according to its attributes. At least one of the controls is a graphically rendered control responsive to position-based user interaction.

Interactive analysis logic is responsive to the dimensional analysis control and the attribute analysis control for the same data, and is responsive to user input via the dimensional data analysis control and user input via the attribute analysis control to incrementally update the state of a data presentation from an existing state to a new state. It can then remain responsive in the new state to further user input via the dimensional data analysis control and further user input via the attribute analysis control to incrementally update the presentation from the new state to further new states.

In preferred embodiments, the interactive analysis logic can be operative to present a visualization of at least a subset of the data in the data set in one or more visualization windows, with each visualization being simultaneously and interactively responsive to the dimensional analysis control and the attribute analysis control. The interactive analysis logic can be operative to update the graphical data visualization in response to user input via the dimensional analysis control and user input via the attribute analysis control independent of intermediate user interaction with any other controls. User input via the dimensional analysis control can cause the dimensional analysis control to transition between one of at least three states, with user input via the attribute analysis control causing the attribute analysis control to transition between one of at least three states, and with each state transition generating one of a series of different successive queries to the data set. The interactive analysis logic can be operative to update the data presentation in less than one second. Parameters of the dimensional analysis control can be responsive to changes in data selection using the attribute analysis control. Parameters of the attribute analysis control can be responsive to navigation through hierarchies using the dimensional control. Aggregation measure control logic can be operative to aggregate data sets defined using the dimensional control according to different aggregation measures. A same type of control can be used for dimensionally organized data and non-dimensionally organized data. The dimensional analysis control can be substantially continuously adjustable. The dimensional analysis control and the attribute analysis control can be responsive to actuation by a same pointing device. The dimensional analysis control can include a slider. The dimensional analysis control can include a filter control. The dimensional analysis control can include a hierarchically organized filter control. The dimensional analysis control can include a tree-based control. The dimensional analysis control for one dimension and a further dimensional access control for another dimension can be associated with the same visualization. The system can include logic operative to recognize dimensional organization in the data set. The system can include dimension input logic operative to retrieve external stored dimensions for the data set. The system can include dimension input logic operative to retrieve external stored dimensions for the data set from local storage. The system can include dimension input logic operative to retrieve external stored dimensions for the data set from an external system. The system can include dimension user input logic responsive to user input to retrieve dimensions for the data set. Dimensional and attribute information can be stored in a centrally managed model that can be shared among many users. The dimensionally organized data can be organized according to a hierarchy. The system can include stored logic to handle predetermined types of hierarchies. The system can include stored logic to handle a plurality of the following types of hierarchies: time-based hierarchies, money-based hierarchies, and distance-based hierarchies. A same data subset can be treated as an attribute or a dimension. The data analysis system can include spreadsheet functionality. The data analysis system can include interactive data visualization logic operative to include graphical visualizations in the data presentation. The data analysis system can be a statistical package that includes a plurality of advanced statistical functions. The data analysis system can be an OLAP system, with the dimensional analysis control being an OLAP control. The data analysis system can be a reporting system. The data set can be accessed from a commercial relational database. The data analysis system can be built into the commercial relational database. The data analysis system can be built into a larger product and can provide one or more data analysis views that relate to the functions of the larger product. Further analysis controls can be available to the user.

In another general aspect, the invention features a method for analyzing data from a data set that includes receiving at least one attribute analysis command from a user to analyze the data in the data set according to its attributes and incrementally updating the state of a data presentation from an existing state to a new state in response to the attribute analysis command received in the step of receiving an attribute analysis command. The method also includes receiving at least one dimensional analysis command from a user to navigate dimensionally organized data in the data set according to its dimensional organization and incrementally updating the state of a data presentation from an existing state to a new state in response to the dimensional analysis command received in the step of receiving a dimensional analysis command. The method further includes remaining responsive to further graphical attribute analysis commands and to further graphical dimensional analysis commands to incrementally update the presentation to further new states after each of the steps of incrementally updating. At least one of the attribute analysis command and the dimensional analysis command is based on position-based interaction. In preferred embodiments, the graphical attribute analysis command and the graphical dimensional analysis command can be received from a pointing device.

In a further general aspect, the invention features a system for analyzing data from a data set that includes means for receiving attribute analysis commands from a user to analyze the data in the data set according to its attributes and means for incrementally updating the state of a data presentation from existing states to new states in response to the attribute analysis commands received by the means for receiving attribute analysis commands. The system also includes means for receiving dimensional analysis commands from a user to navigate dimensionally organized data in the data set according to its dimensional organization and means for incrementally updating the state of a data presentation from existing states to new states in response to the dimensional analysis commands received by the means for receiving dimensional analysis commands. Further included are means for remaining responsive to further graphical attribute analysis commands and to further graphical dimensional analysis commands to incrementally update the presentation to further new states. At least one of the means for receiving an attribute analysis command and the means for receiving a dimensional analysis command is graphically rendered.

Systems according to the invention can have the advantage of allowing their users to instantly and seamlessly choose between attribute analysis and dimensional analysis perspectives. This allows them to bring a much larger set of different approaches to a data analysis problem in an intuitive and efficient manner. The result is an enrichment of the user's mental framework for particular problems that can lead to solutions that might not have been easily discovered with the disparate tools available in the prior art, which have been generally divided between data visualization vendors on one hand and reporting and OLAP vendors on the other.

Systems according to the invention may also be advantageous in that they need not require the user to take intermediate steps between performing dimensional analysis and attribute analysis. The user need not exit one application, or application part, and enter another—everything can be available in a single screen. Nor does the user need to interact with cumbersome intermediate controls, such as intermediate dialog screens that require the user to enter values or other data. This can help to provide a seamless interface that speeds up analysis tasks and enhances the user's understanding of the data.

DETAILED DESCRIPTION OF AN ILLUSTRATIVE EMBODIMENT

Figure 1:
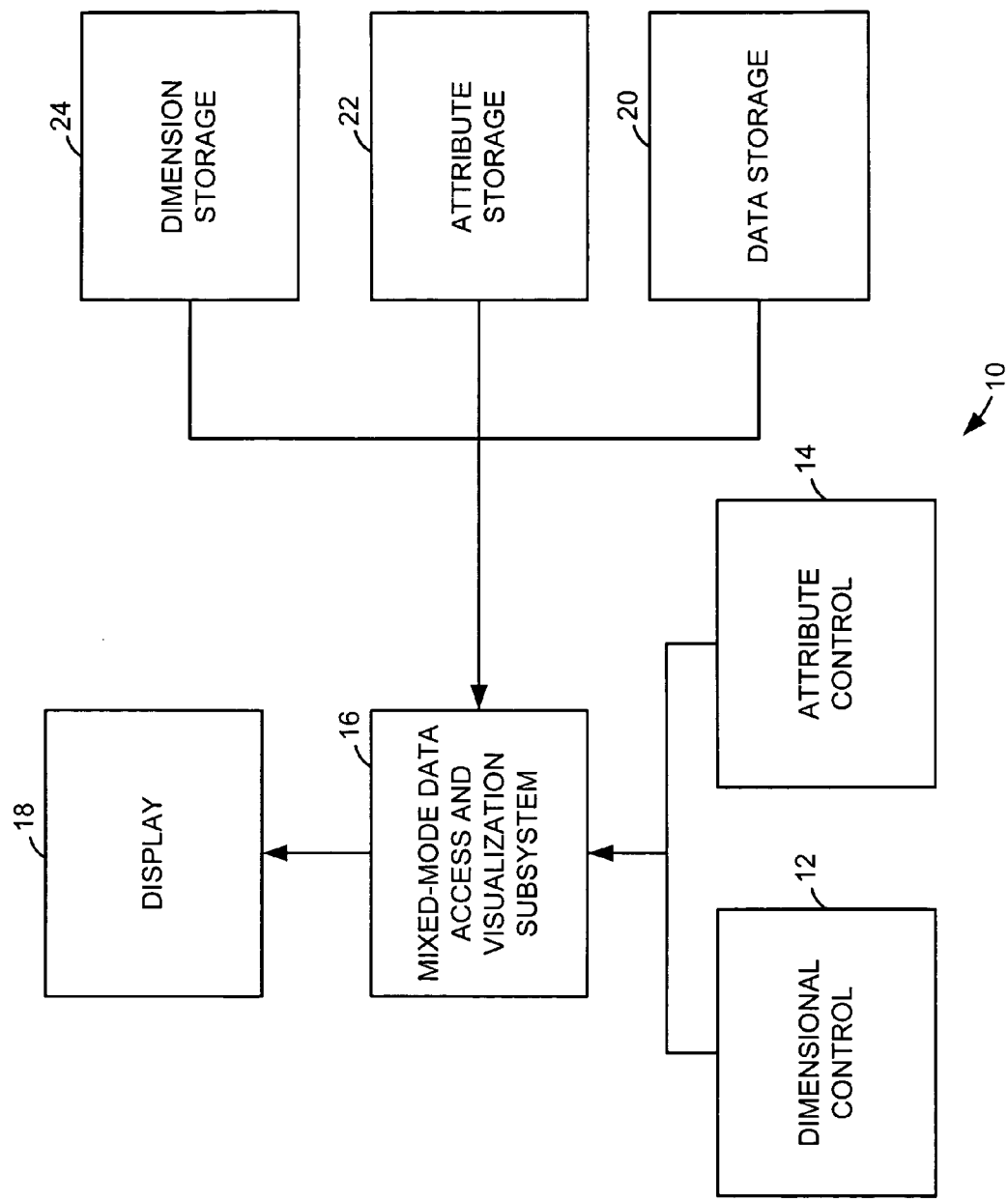
FIG. 1 is a block diagram showing an illustrative embodiment of a unified interactive data analysis system according to the invention.

Referring to FIG. 1, an illustrative unified interactive data analysis system 10 according to the invention includes a unified interactive data access and visualization subsystem 16 that has inputs responsive to a dimensional control 12 and an attribute control 14. It also has an output that provides display data to a display device 18. These parts of the system can be implemented using special-purpose hardware, software running on a general-purpose processor, or a combination of both. In addition, while the system can be conceptually divided as shown in FIG. 1, one of ordinary skill in the art would recognize that it is also possible to combine the different parts of the system and/or split them in different ways to achieve a different breakdown.

Figure 14:
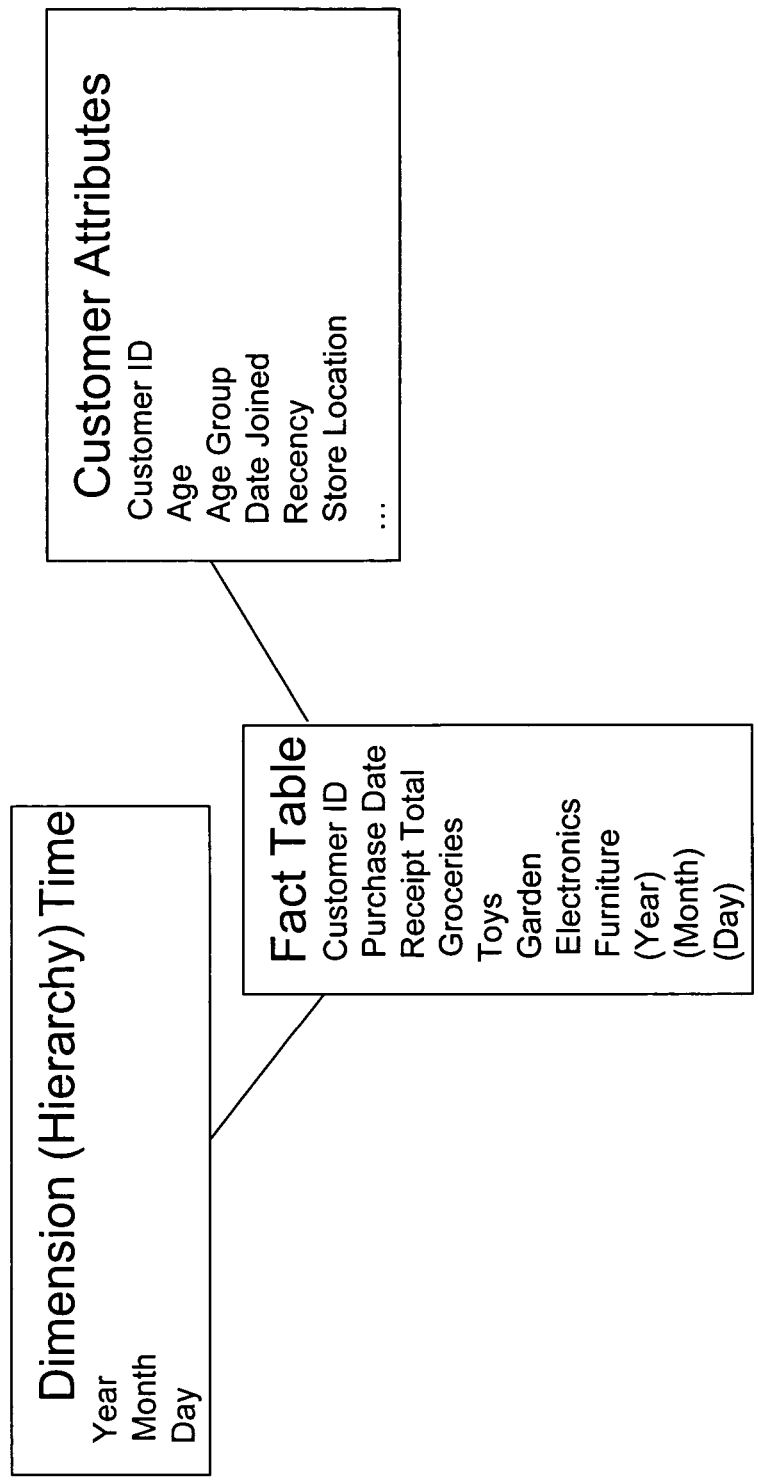
FIG. 14 is a block diagram illustrating the organization of a sample data set for the system of FIG. 1 in the illustrative states shown in FIGS. 2-13.

Referring to FIG. 1, the data access and visualization subsystem also includes one or more data access inputs that are responsive to data storage 20, to attribute storage 22, and to dimension storage 24. These inputs can access data sets in a variety of ways, such as through direct access to a database, data stream, or file system. Other methods can include access through an application or operating system interface, by remote network access to a service, or by receiving pasted data or other user input. Two or more of these methods can also be combined to access data to be analyzed from different sources. In one embodiment, for example, data and its attributes and dimensions can all be accessed from linked tables in a single database (see FIG. 14). In another embodiment, data and its attributes are stored in one database, and dimensions are stored in another database. Dimensions and attribute information can also be stored using a centrally managed model that can be shared among many users. In one embodiment, a cache is used for this purpose.

The system 10 can also include native dimensional setup functionality that can help to provide dimensions for data sets accessed by the system. This functionality can employ specialized dimension assignment controls to allow a user to easily assign dimensions to one or more columns in a data set. It can also operate automatically to detect certain known types of dimensions, such as time-based dimensions, money-based dimensions, or spatially based dimensions. This automatic detection can be based on data labels, or on rules that interpret the data itself, such as rules that find the names of months to identify a textual date field.

Dimensions divide data into meaningful subgroups and are used to perform aggregation at different levels. One type of dimension is a hierarchy, but not all dimensions are usually thought of as naturally hierarchical. Examples of naturally hierarchical dimensions include time, where smaller units such as minutes add up to larger units such as hours or days, or geopolitical dimensions, where smaller units such as towns are parts of larger units such as states or countries. Other examples of naturally hierarchical dimensions include gene ontology, MEDRA, or zip codes. Categorizing data in naturally hierarchical dimensions can sometimes be sufficient to reveal patterns, such as the cyclical nature of shopping patterns that might become apparent from a time hierarchy.

Examples of dimensions that are not usually thought of as naturally hierarchical include shipping weight or color. Hierarchies may be imposed on data that is not naturally hierarchical, however, such as by dividing colors into decorator's categories or dividing shipping weights into ranges that correspond to different carrier types. Conversely, the hierarchical nature of data may be ignored in situations where it is not important.

The system 10 uses attributes to describe data (e.g., customer, product etc.) and to perform operations such as comparisons or correlations over two or more attributes. But the system also permits attributes and dimensions to be freely interchanged. A dimension can therefore be used for aggregation in one visualization and treated as an attribute in another. Conversely, an attribute, such as gender, can be treated as an attribute in one visualization and a dimension in another. The user can even treat hierarchical dimensions as attributes and vice-versa.

Dynamic filtering, such as through the use of query devices or a visualization itself, can allow the user to change the composition of a data set in real time such that a subset of the data can be analyzed, both for aggregated (dimensionally driven) views and for detailed comparative (attribute driven) views. As presented in more detail below, the combination of attributes, dimensions, and the dynamic filtering creates an interface that allows the user to ask/post questions of the data in real time as they come to mind, such as:

What is the sum of sales per month for customers that are in the age group 40-50 who joined in 1994?

And what are their "profiles"—gender, buying habits?

And what is the range and spread of their average receipts?

The illustrative system 10 is based on the DecisionSite interactive data visualization system, which runs on one or more workstation computers outfitted with an operating system such as Microsoft's Windows® XP operating system. These types of systems are described in more detail in, for example, in U.S. Pat. No. 6,014,661 to Ahlberg, et al., which is entitled "System and method for automatic analysis of data bases and for user-controlled dynamic querying," issued 11 Jan. 2000, and is herein incorporated by reference.

Figure 2:
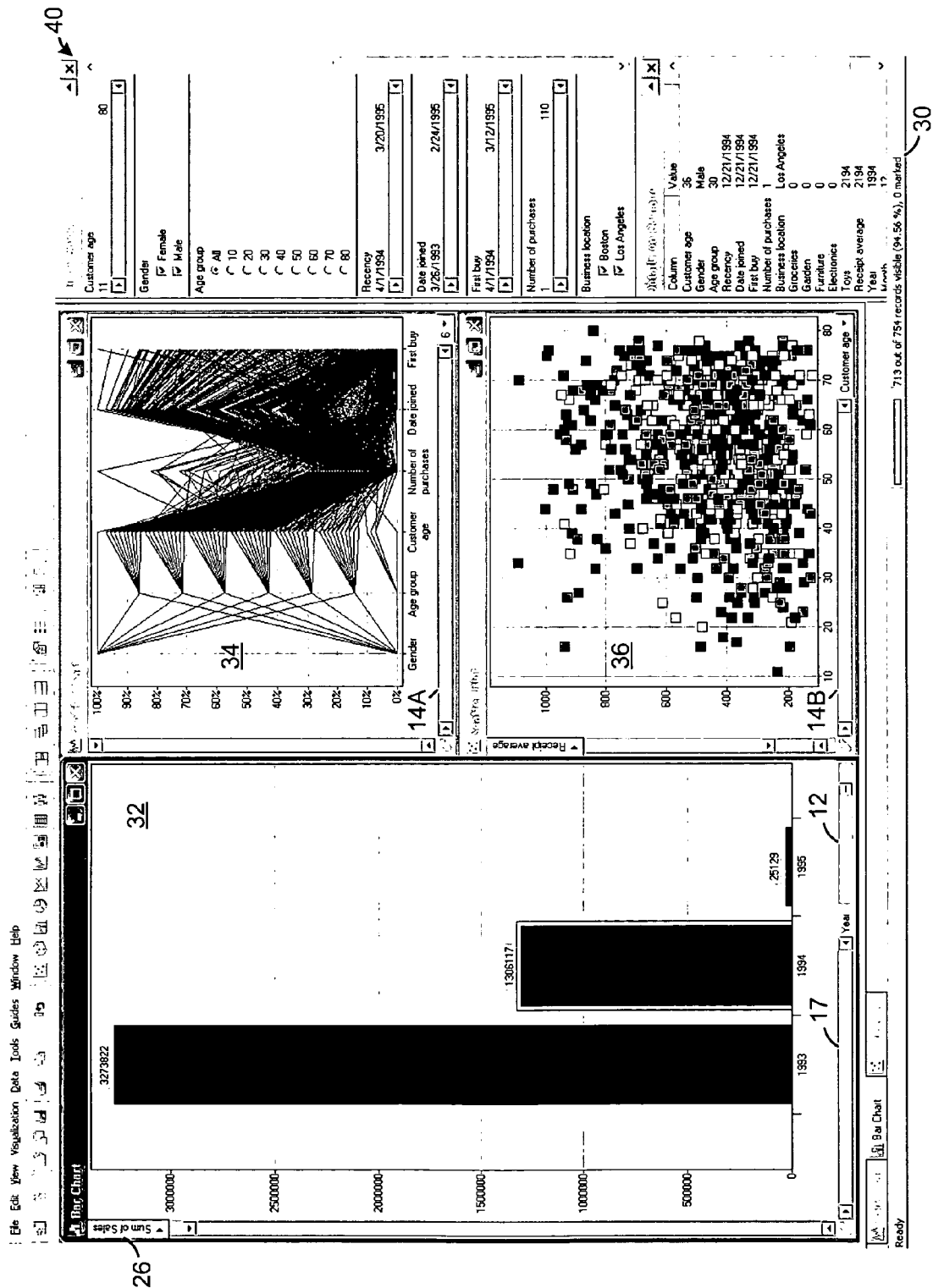
FIG. 2 is a diagram of an analysis window for the system of FIG. 1, showing visualizations for a first data set.

Referring to FIG. 2, an example of the operation of the system 10 will now be discussed in more detail. The unified interactive data access and visualization subsystem can present one or more data visualization windows in an application window 30 on the display device 18 based on a stored data set that includes data, dimensions, and attributes (see FIG. 14). These visualization windows can each display dimensional and/or attribute analysis information. In the state in which it is shown in FIG. 2, the system displays one dimensional analysis window 32 that presents a bar chart, and two attribute-attribute windows 34, 36 that respectively present a profile chart and a scatter plot.

The scatter plot compares two customer attributes against one another, in this case customer age vs. receipt average. The profile chart compares several customer attributes per customer, such as gender, age group, customer age, number of purchase, date joined, and first buy. Users can change the attributes or dimensions that they use, such as by manipulating the drop-down list controls on one or both of their axes. They can also create more visualization windows of a variety of different types, including dimensional-attribute analysis windows or dimensional-dimensional analysis windows.

Figure 18:
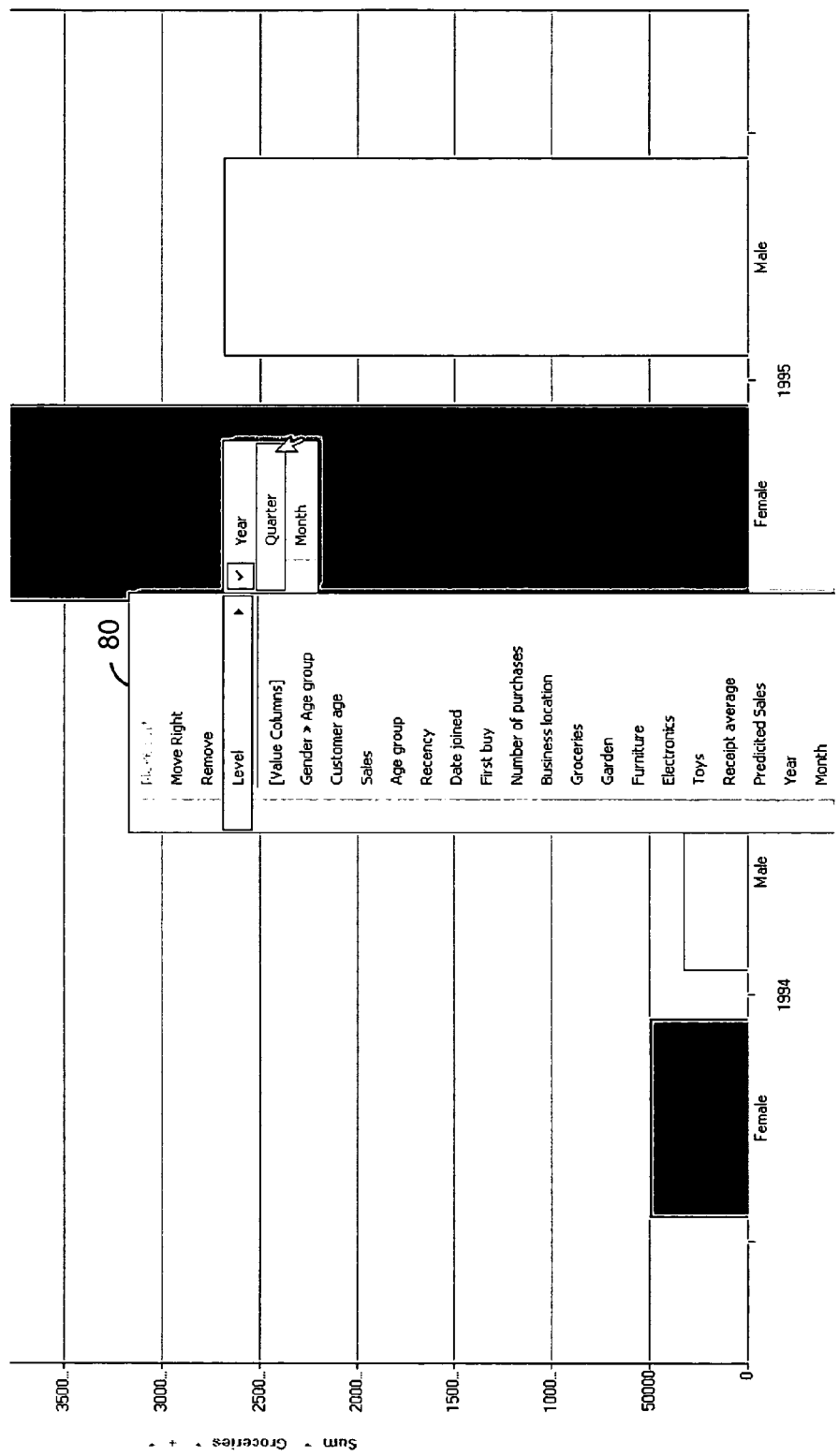
FIG. 18 is diagram of part of an analysis window showing a menu-based dimensional control.

The dimensional analysis window 32 is associated with a dimensional control 12 on its x-axis, which can be a multi-positional selection control, such as a slider. This control allows the user to navigate different levels within a dimension, which is a time-based hierarchy in the example shown in FIG. 2. The user can also select a range to display within a level using another control, such as a query device slider. Although the combination of drop-down list and slider are currently preferred, other types of control sets could readily be devised, such as a combination of a keyboard-based variable selection tool and a tree-based dimensional control similar to a directory navigation tool. As shown in FIG. 18, one approach employs a multi-level menu 80 that is populated with the names of the hierarchical entities used in the selected analysis.

The dimensional analysis window also includes an aggregation measure control 26 on its y axis. This type of control allows the user to select a measure to aggregate, such as "sum" or "average." In the state shown in FIG. 2, for example, each bar shows the sum of sales for all selected customers on a per-year basis. The dynamic filter controls 40 that the system provides for the database columns determine which customers are selected.

Aggregation measure commands could also be made available in a variety of other forms. For example, clicking on a color box could either gray out or exclude colors in a scatter plot or profile chart that are not associated with an aggregation, or bring the aggregated color markers to the front to show the aggregation. Widths or other dimensions could show the average, sum, or other aggregation measure.

Figure 3:
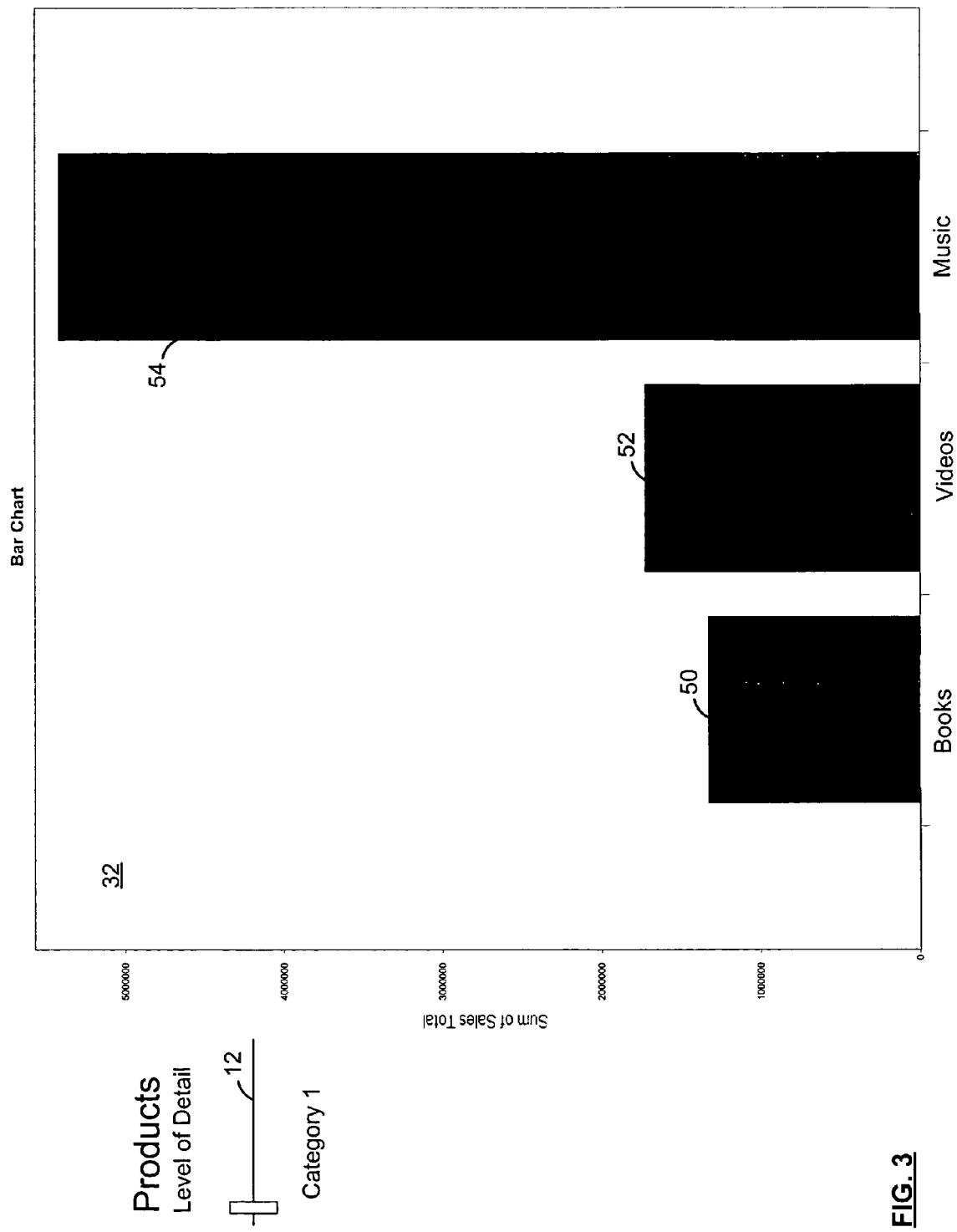
FIG. 3 is a simplified diagram of a dimensional control and visualization for the analysis window of FIG. 2 showing a first state of the dimensional control and visualization.

Operation will now be discussed in more detail in connection with the simplified diagram shown in FIG. 3, which shows only the visualization in the dimensional analysis window 32 and the dimensional control 12. The dimensional control is initially set at one of its coarsest levels called "Category 1." In this state, the visualization shows a bar chart with bars that show the sum of sales for broadly classified product types: books 50, videos 52, and music 54.

Figure 4:
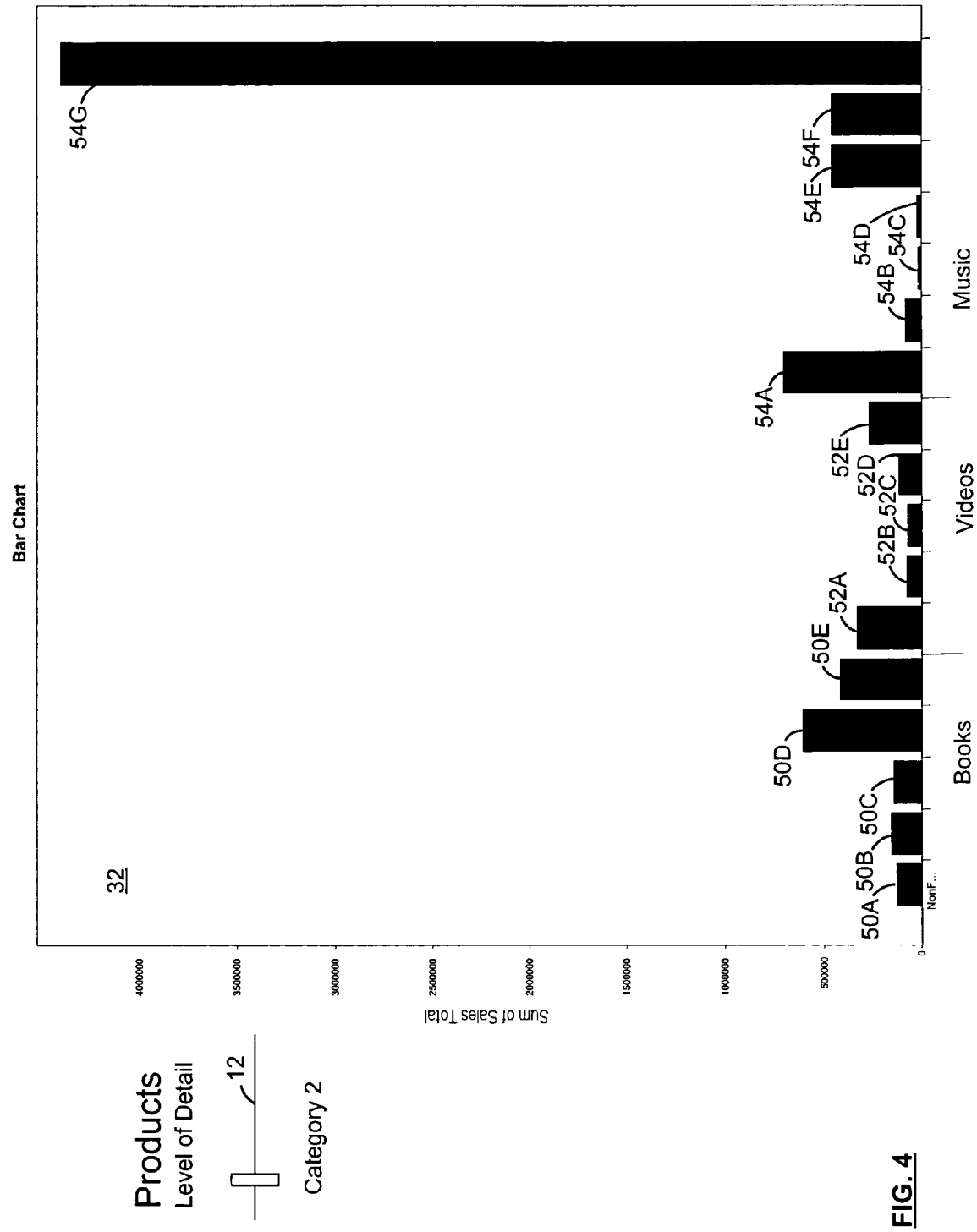
FIG. 4 is a simplified diagram like the one shown in FIG. 3 showing the dimensional control and visualization in a second state.

As shown in FIG. 4, using the dimensional control 12 to change the dimensional level from "Category 1" to "Category 2" causes the bars in the bar chart to show data on a finer level of categorization. In this state, the visualization shows bars for types of books, such as nonfiction 50A, reference and textbooks 50B, children's books 50C, cookbooks 50D, and fiction 50E. Types of videos 52A-52E and music 54A-54G are also shown. This change does not change the attribute views, since only the aggregation level is changed.

Figure 5:
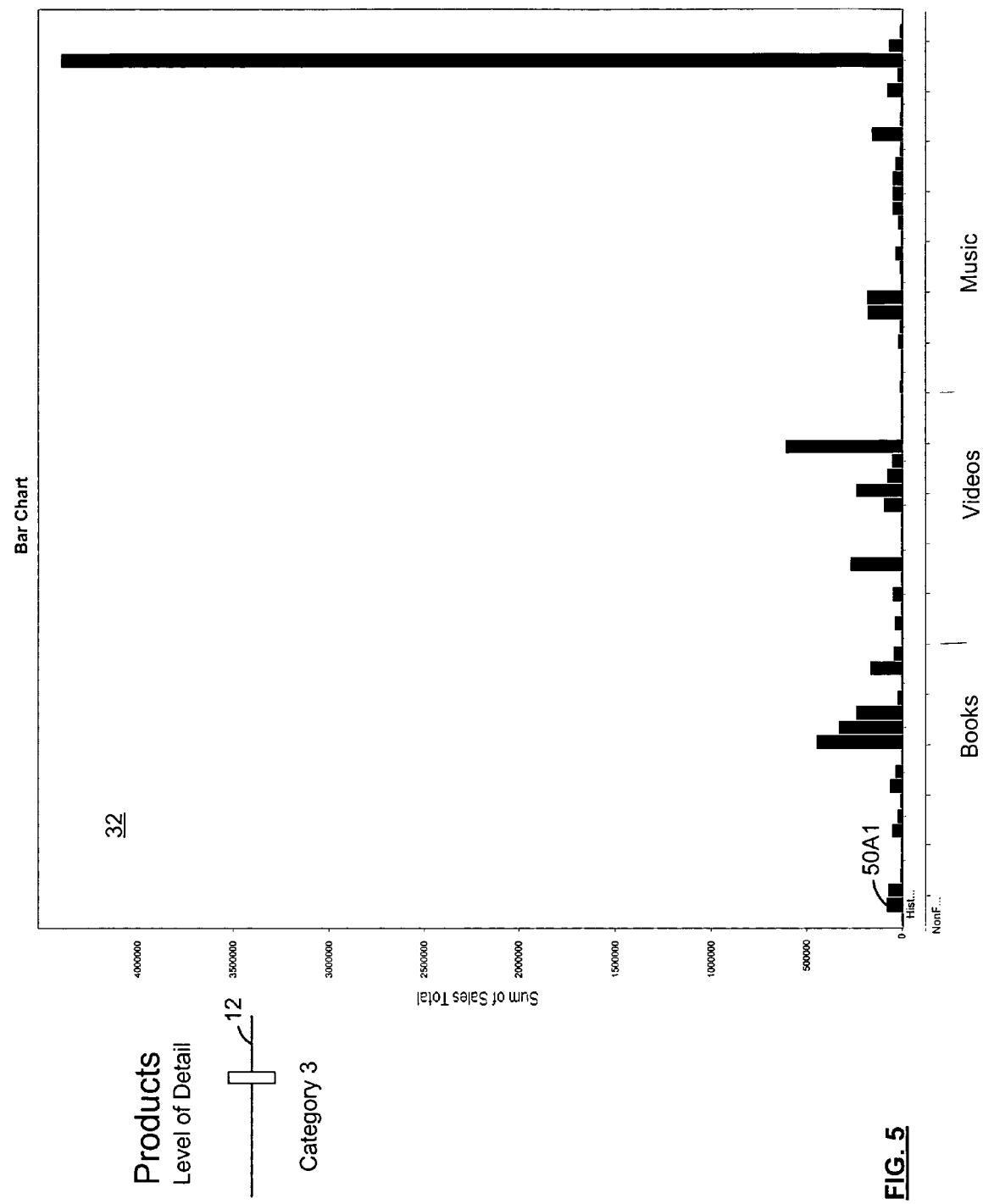
FIG. 5 is a simplified diagram like the one shown in FIG. 3 showing the dimensional control and visualization in a third state.

As shown in FIG. 5, using the dimensional control 12 to change the dimensional level from "Category 2" to "Category 3" causes the bars in the bar chart to show data on an even finer level of categorization. In this state, the visualization shows bars for subcategories of each type of book, such as history 50A1 in the nonfiction type 50A. The bars should preferably be labeled at the different levels of categorization to the extent possible, but for clarity's sake, only one of these labels is shown at the "Category 2" and "Category 3" levels in FIG. 5. These labels are also omitted from other views for clarity's sake.

Figure 6:
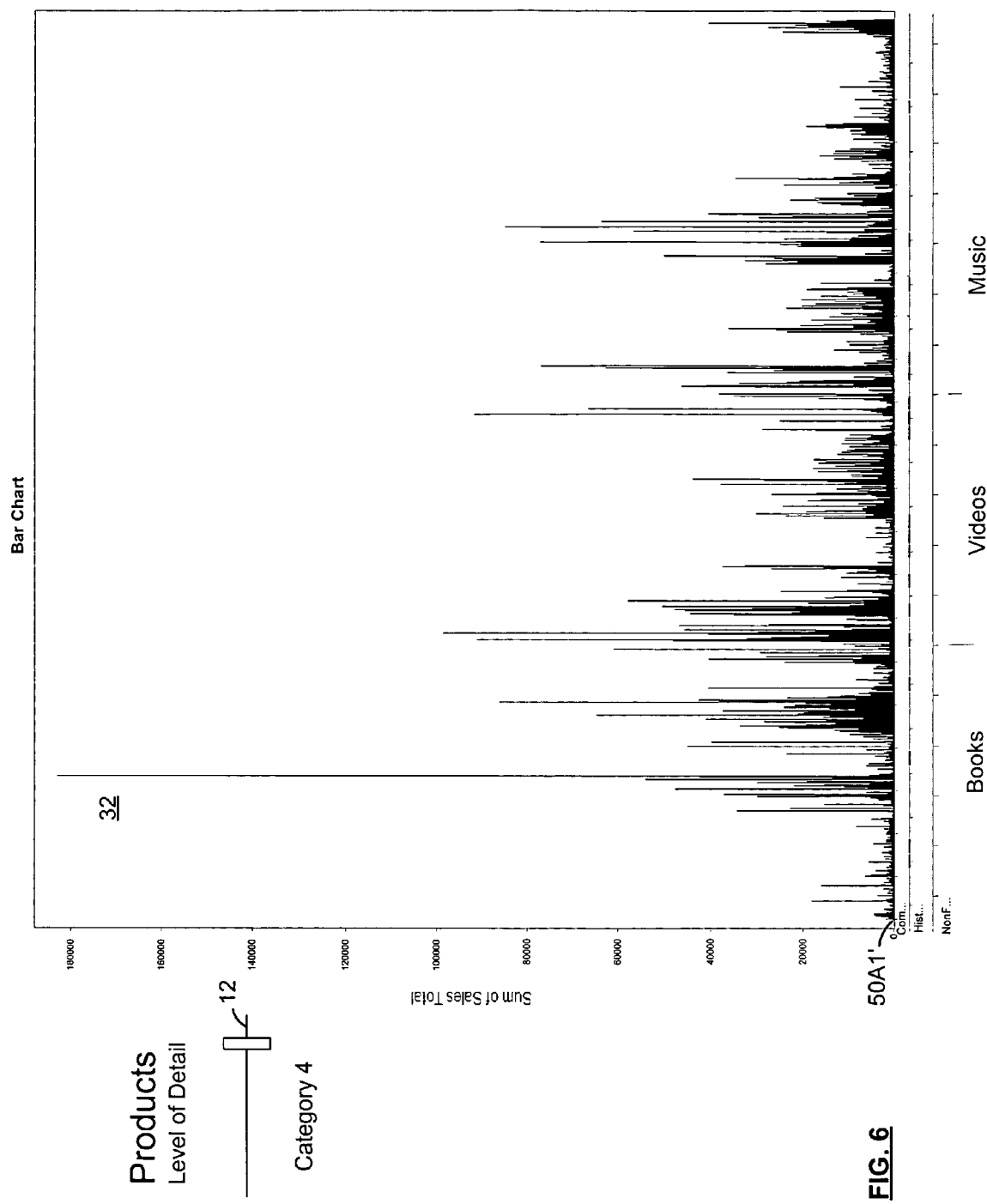
FIG. 6 is a simplified diagram like the one shown in FIG. 3 showing the dimensional control and visualization in a fourth state.

As shown in FIG. 6, using the dimensional control 12 to change the dimensional level from "Category 3" to "Category 4" causes the bars in the bar chart to show data on an even finer level of categorization. In this state, the visualization shows bars for individual book titles within the subcategories of each type of book, such as "Common Law, The" 50A1' in the history subcategory 50A1 of the book type 50A.

Figure 7:
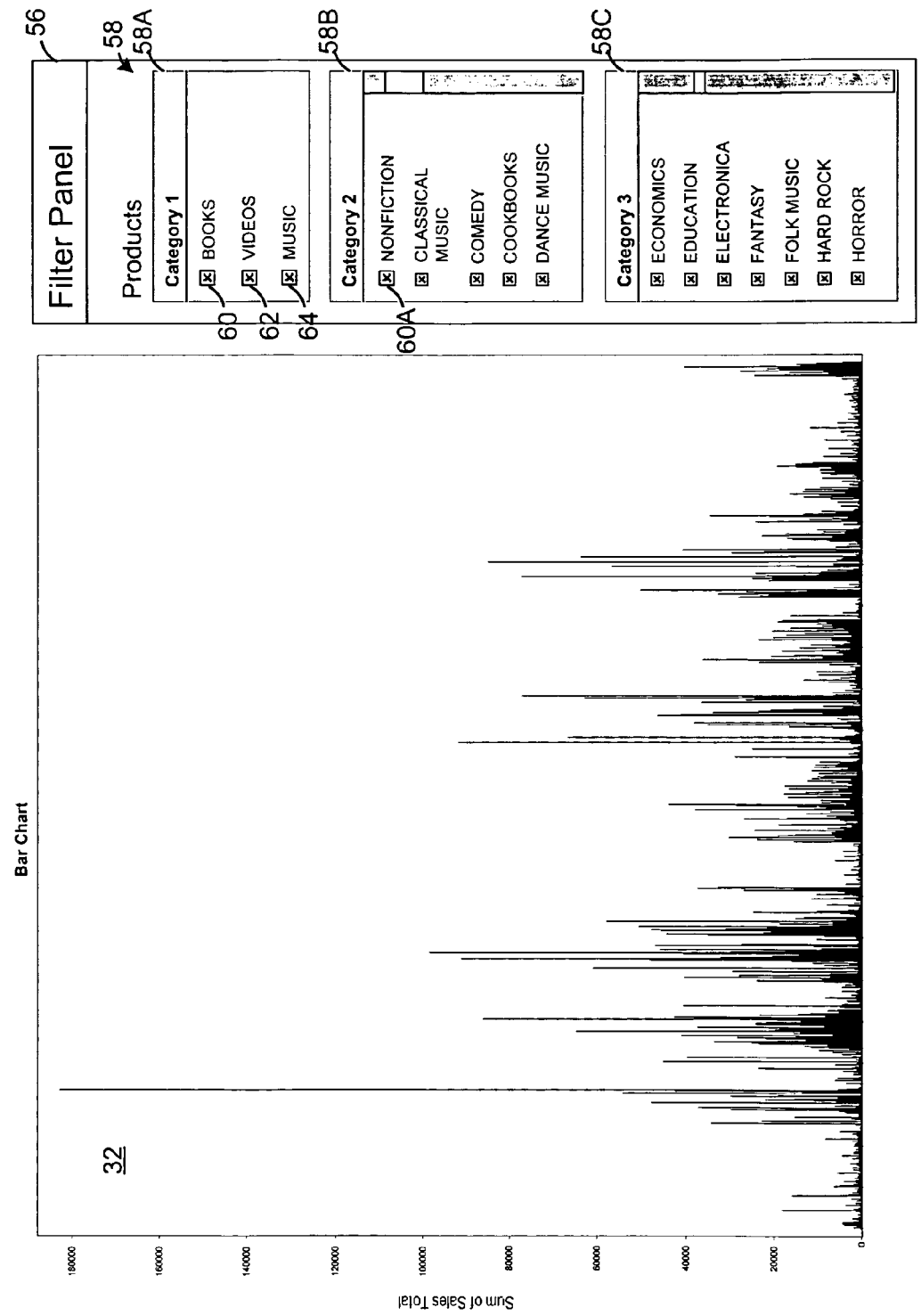
FIG. 7 is a simplified diagram like the one shown in FIG. 3 showing a filter panel and the visualization in a fifth state.
Figure 15:
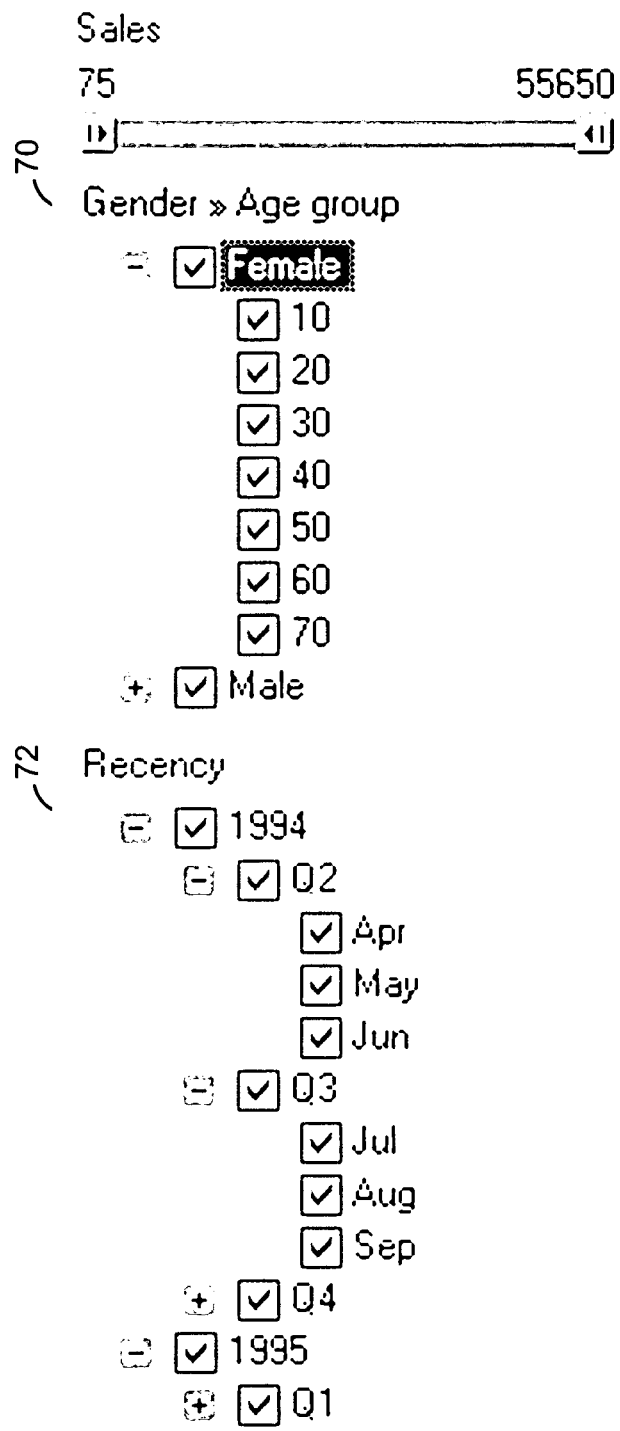
FIG. 15. is a diagram of a sidebar that includes two examples of a dimensional query device for use with the system of FIG. 1.

Referring to FIG. 7, dimensional filters can also be used to interact with the data while taking advantage of its dimensional nature. This can be accomplished with a filter panel 56 that includes dimensional filter controls 58. This panel is preferably a multi-level panel that groups the controls logically according to their dimensional structure. Controls for some or all of the products can be provided for broad product types, such as a book filter control 60, a video filter control 62, and a music filter control 64, in one subpanel 58A (the "Category 1" level). Another subpanel can include controls for a finer level, such as a nonfiction control 60A (the "Category 2" level). Although three levels of dimensional filter controls are shown in FIG. 7, this metaphor can be extended to as many levels as is appropriate in the circumstances. And although the multi-level filter panel metaphor is a powerful one in that it allows users to both "drill down" and "drill across," other ways to display these controls could be devised by one of ordinary skill in the art. FIG. 15 shows two other examples of dimensional controls 70, 72.

Figure 8:
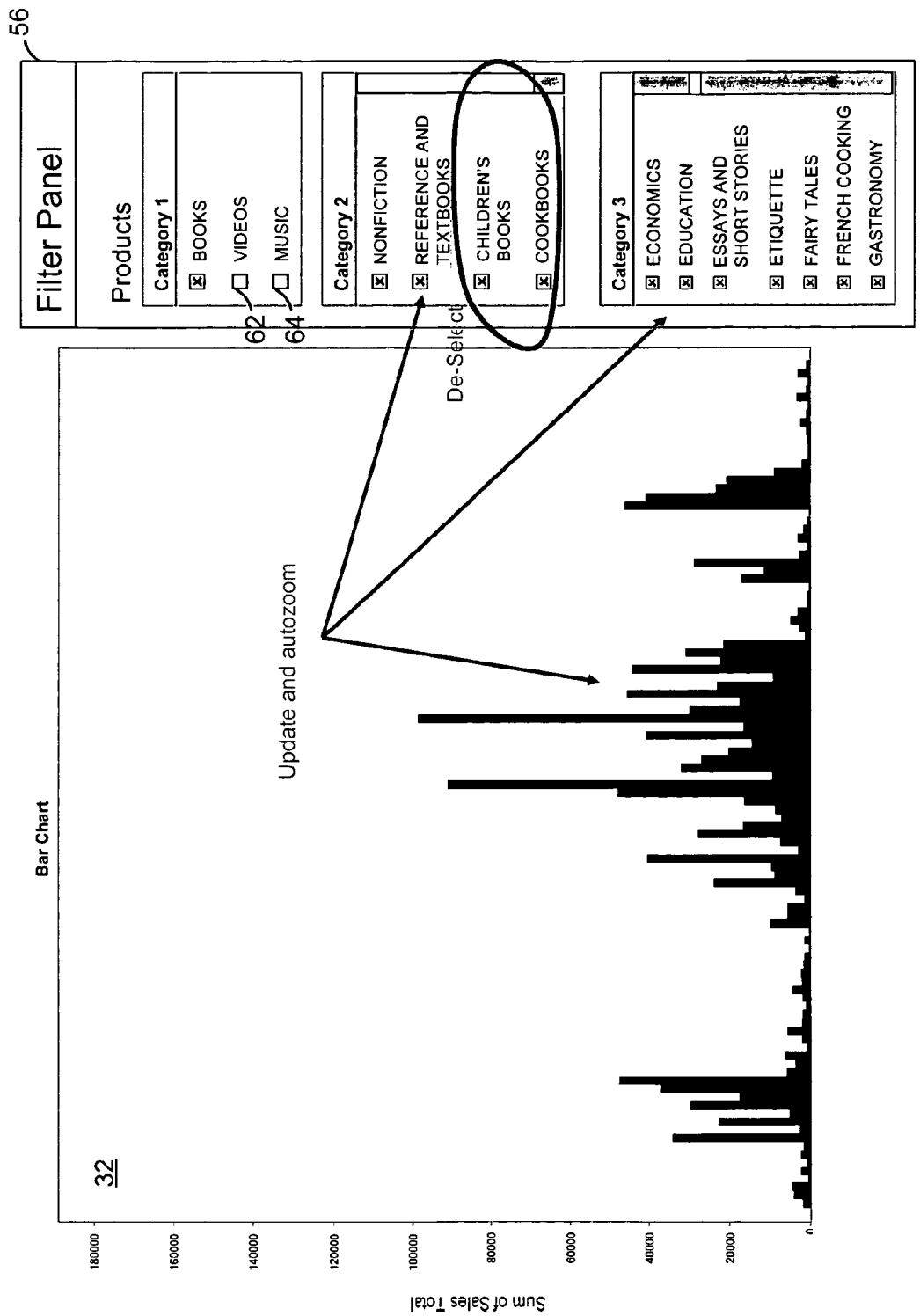
FIG. 8 is a simplified diagram like the one shown in FIG. 3 showing the filter panel and visualization in a sixth state.

As shown in FIG. 8, deselecting the videos filter control 62 and the music filter control 64 will update the visualization and show it without data from these product types. This will allow the user to generally navigate through the data space, and it will also allow the user to break up the data in more sophisticated ways by eliminating some of the items at one level in a hierarchy. Eliminating all of the foreign-language subcategories in the "Category 3" level, for example, could significantly change the shape of one of the visualizations, which might provide some insight into the nature of that segment of the user's business.

Figure 9:
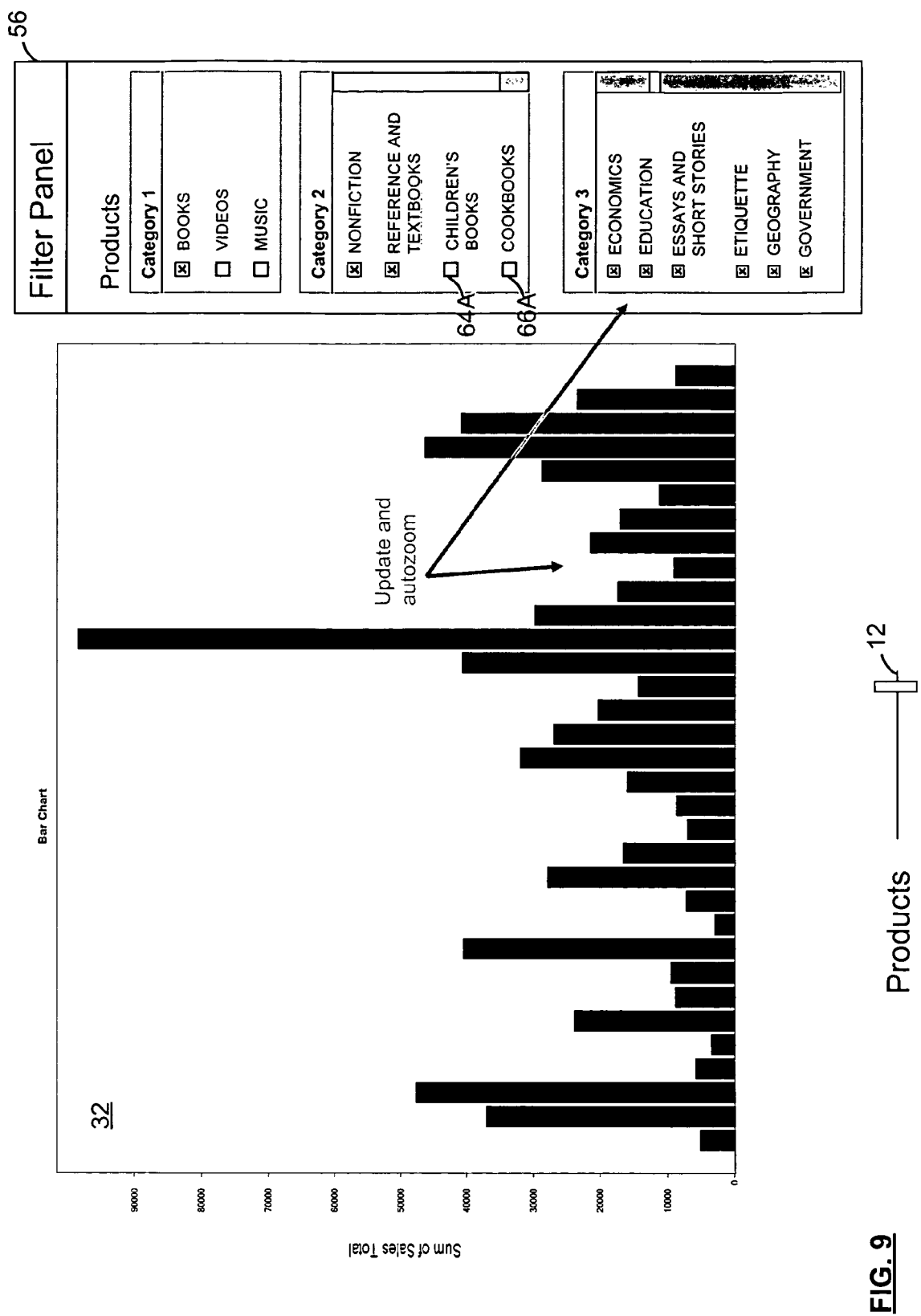
FIG. 9 is a simplified diagram like the one shown in FIG. 3 showing the filter panel and visualization in a seventh state.

As shown in FIG. 9, deselecting children's books filter control 64A and the cookbooks filter control 66A allows the user to navigate deeper into a subset of the data space. As the user drops to a lower level with these types deselected, only the data elements in the remaining types will be displayed on the screen. If there are still too many elements to display at once, the system can display an intra-level navigation control 17 to allow navigation within the level (see FIG. 2). This control effectively provides a horizontal sliding window into the bar chart.

Figure 10:
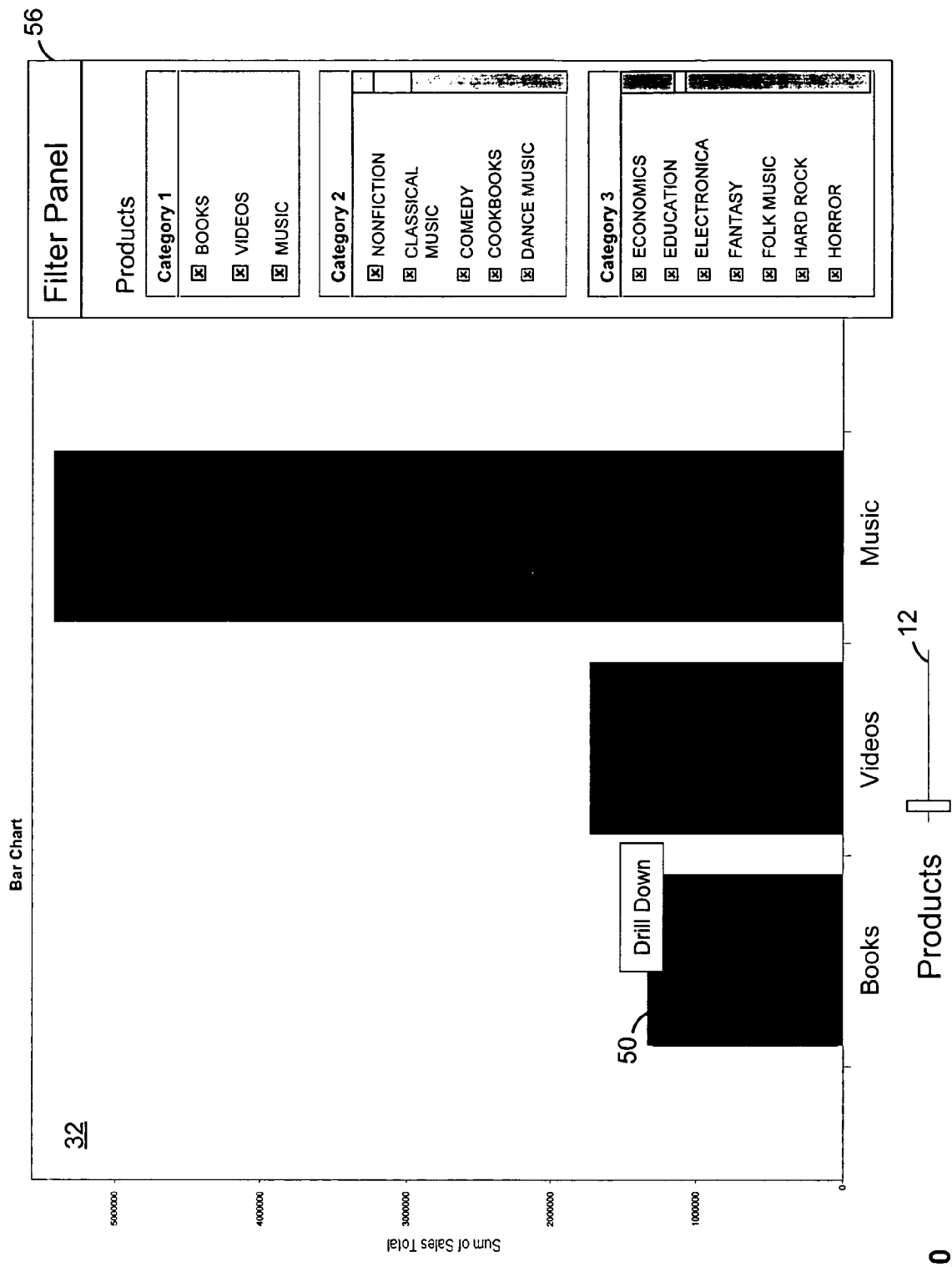
FIG. 10 is a simplified diagram like the one shown in FIG. 3 showing the filter panel and visualization in a eighth state.

Referring to FIG. 10, the system can extend traditional drill-down behavior by allowing the user to mark categories in the visualization and select drill-down or roll-up control. The user can mark books, for example, by clicking on the book bar 50 in the bar chart with a pointing device such as a mouse. Other marking methods could also be used, such as a lasso tool, arrow keys, or a menu selection. Marking the bar causes the system to display it in a different color, and this color can be carried into other open visualizations.

Figure 11:
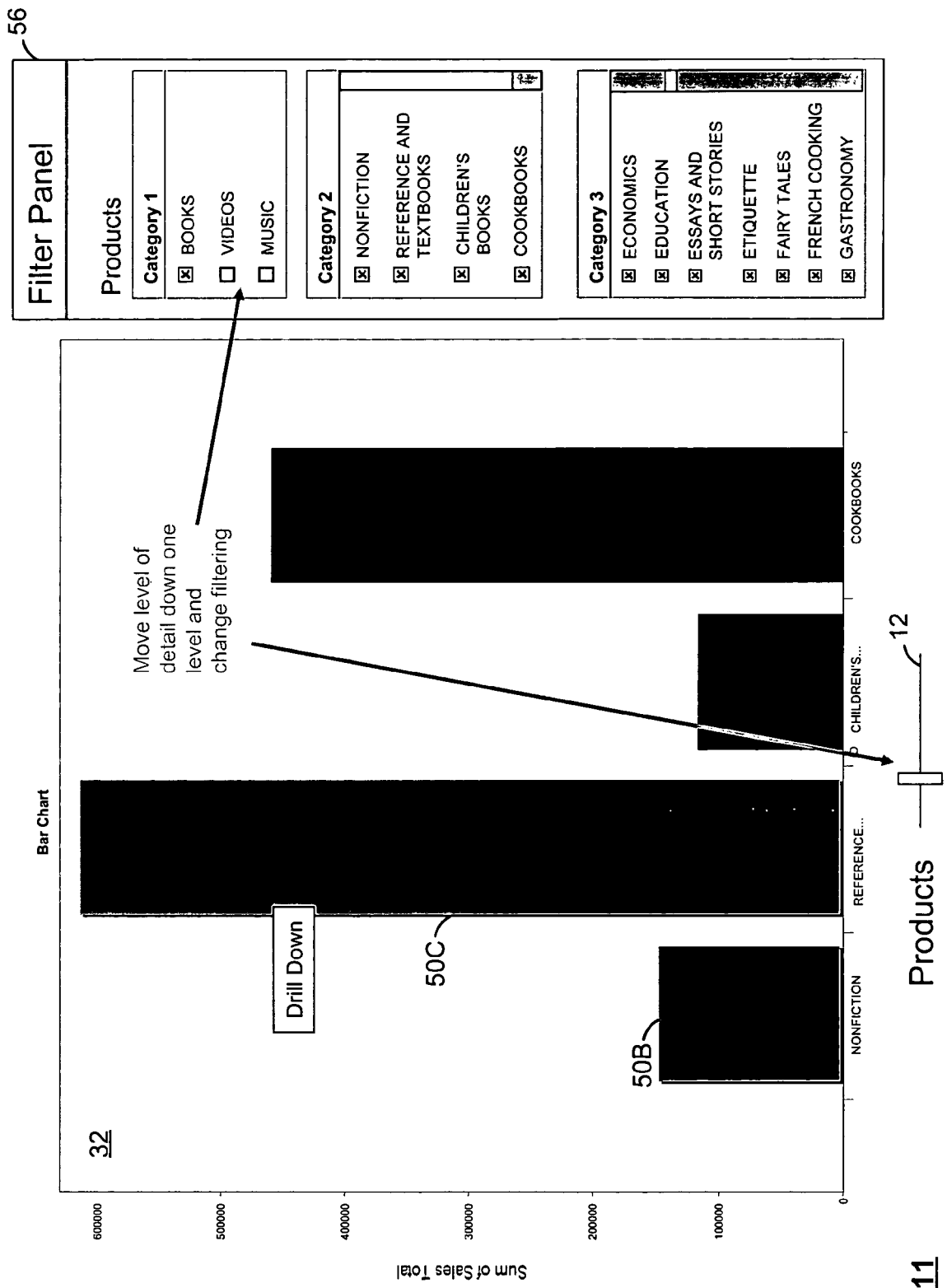
FIG. 11 is a simplified diagram like the one shown in FIG. 3 showing the filter panel and visualization in a ninth state.

Referring to FIG. 11, drill down can be made deeper into the dimension. Here by marking two bars in the bar chart, the adjustment of the dimensional control down one more level to Category 3, results in a view of all Category 3 objects for nonfiction, and reference and textbooks.

Figure 12:
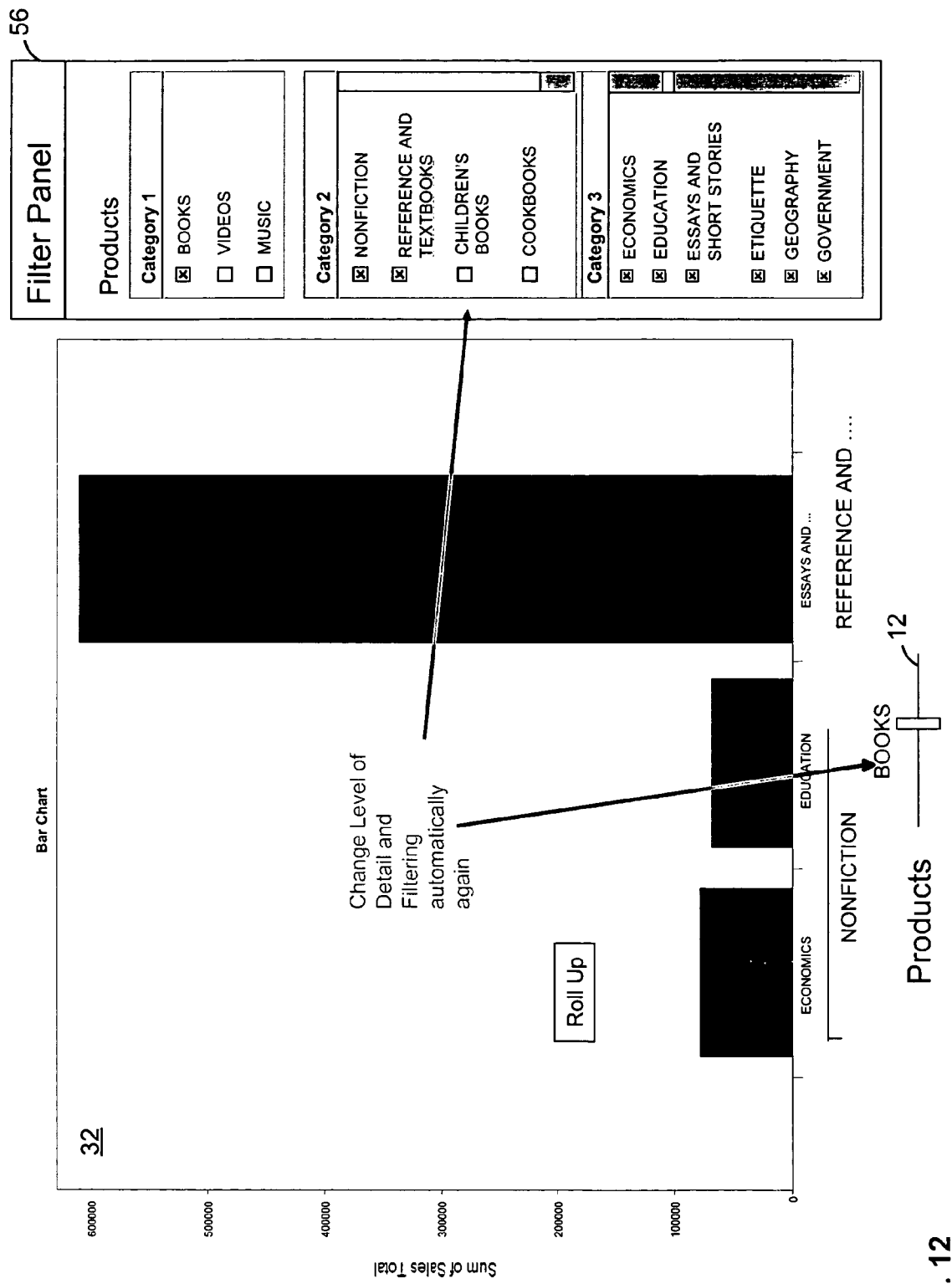
FIG. 12 is a simplified diagram like the one shown in FIG. 3 showing the filter panel and visualization in a tenth state.
Figure 13:
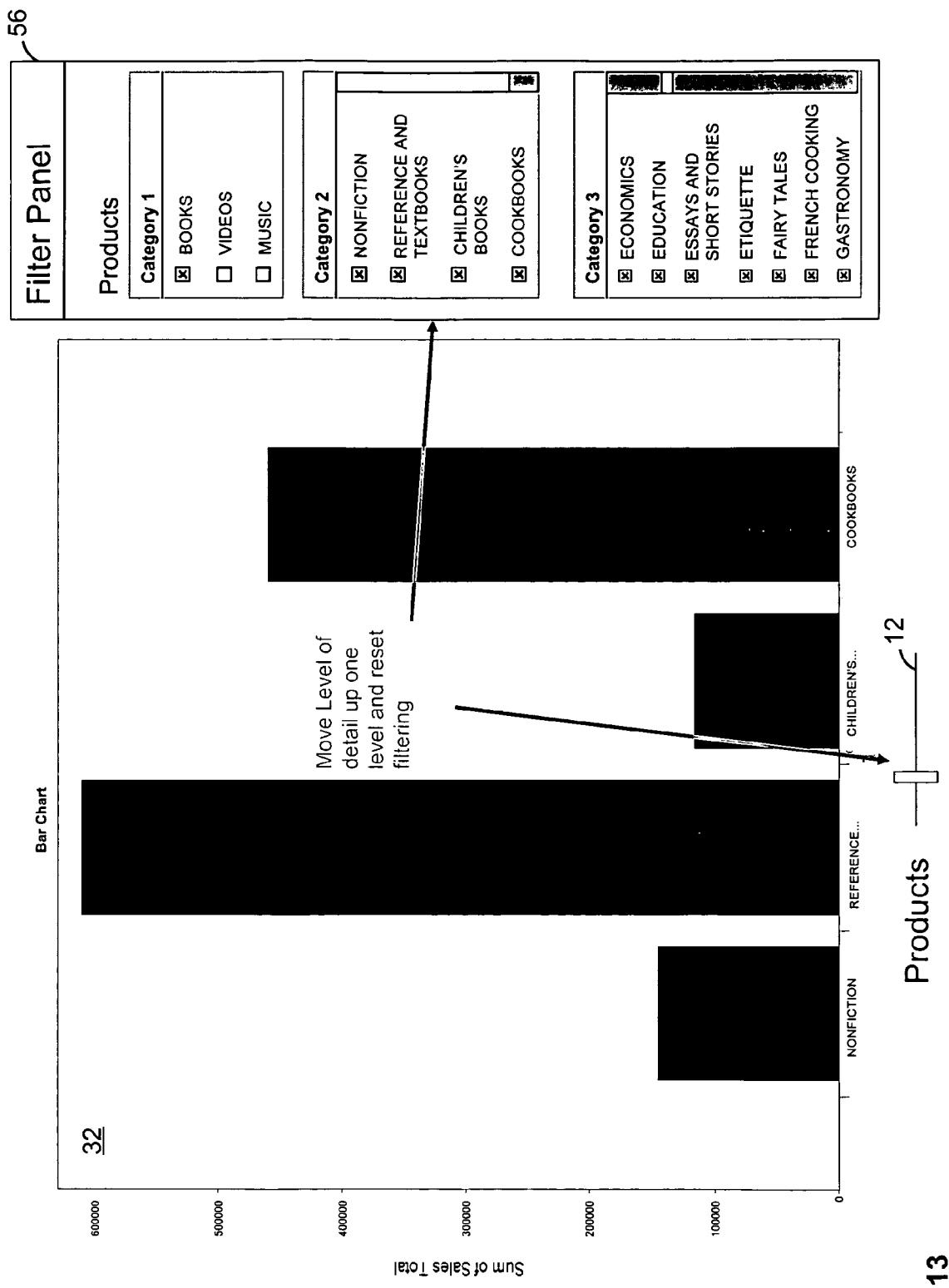
FIG. 13 is a simplified diagram like the one shown in FIG. 3 showing the filter panel and visualization in an eleventh state.

Referring to FIGS. 12 and 13, a roll-up operation is the opposite of a drill-down operation and is particularly powerful when used in connection with the dimensional filters. If a user drills down to a level and uses the filter controls to exclude items for that level (see FIG. 12), he or she can then roll back up to manipulate the filtered data at a higher level of aggregation (see FIG. 13). To try and remove the seasonal effect of holiday-specific books from book sales, for example, a user might first drill down to a level where these items are separately classified, deselect them with a filter control, and then roll back up to obtain a book bar that excludes holiday-specific books. Roll-up operations can be initiated with a variety of different types of controls, such as buttons, menus, or keyboard commands.

Figure 16:
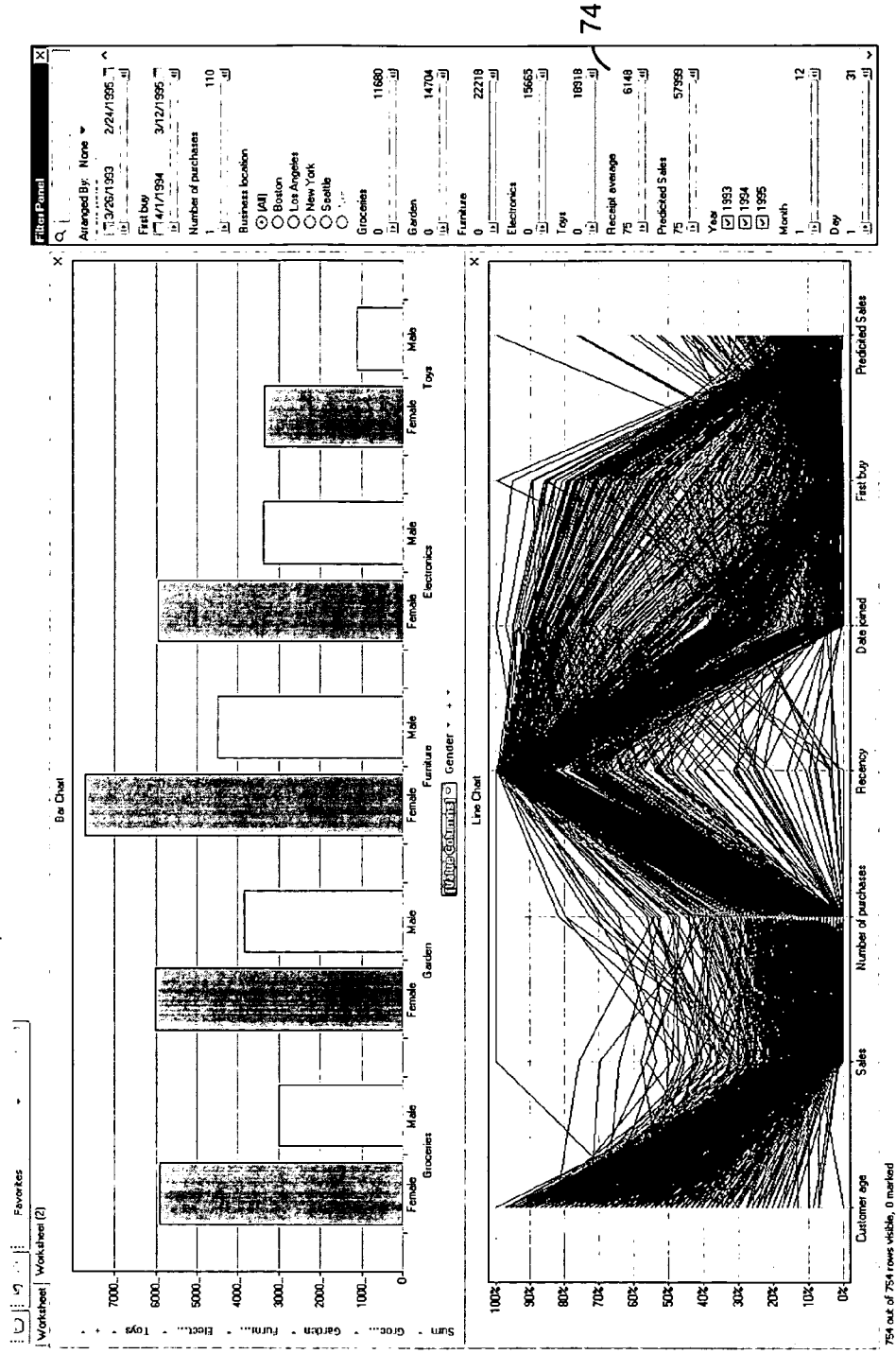
FIG. 16. is a diagram of an analysis window including an illustrative receipt average attribute query device.
Figure 17:
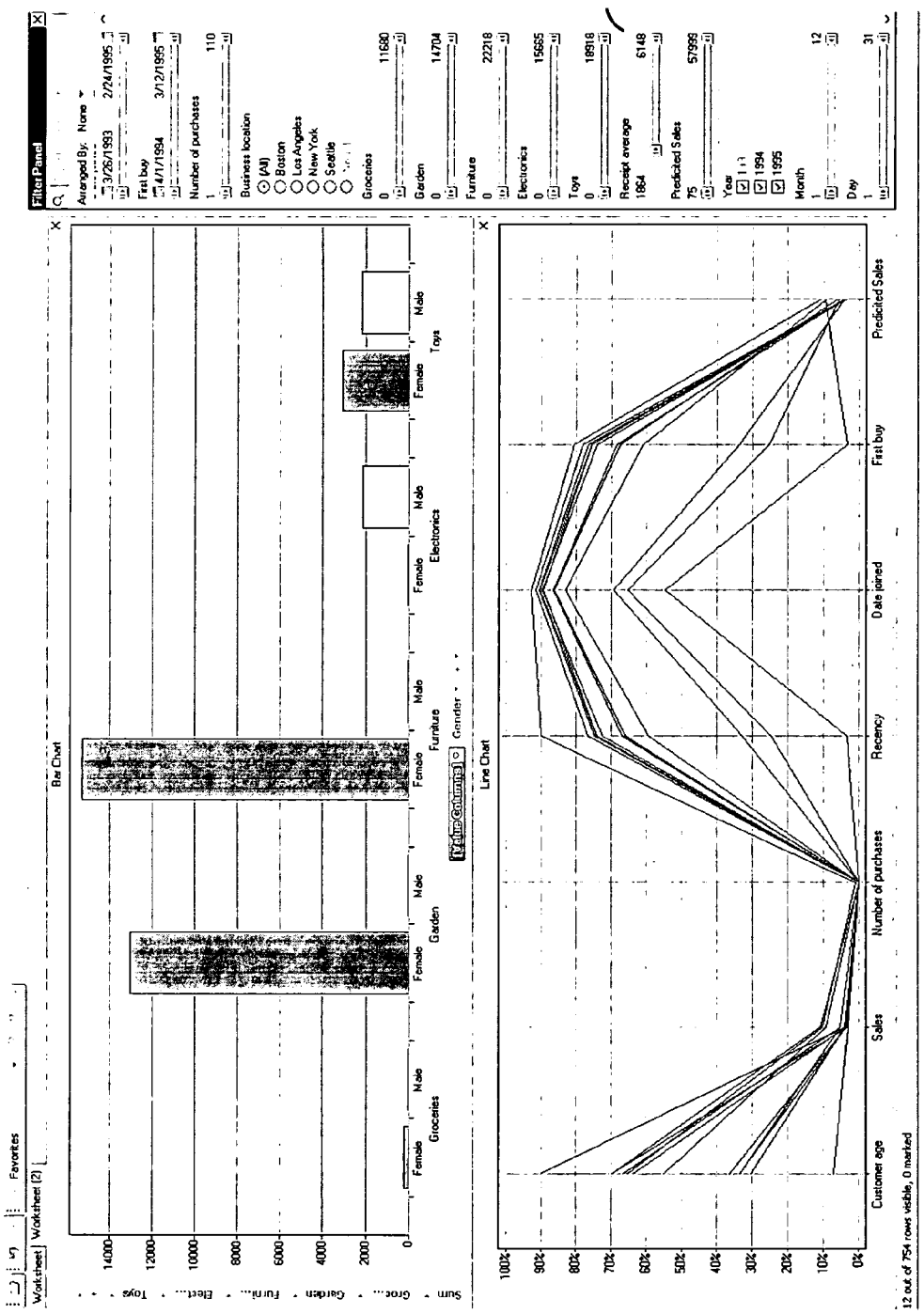
FIG. 17. is a diagram of the analysis window of FIG. 16 after manipulation of the illustrative receipt average attribute query device.

Referring to FIGS. 16 and 17, the system allows not only the combined aggregated representations (dimensional view) and attribute representations to be updated at the same time, but it also makes it possible to interactively filter on any attribute or dimension in the data and have all representations update dynamically. The bar chart in FIG. 16, for example, shows an aggregated view over product category and gender: sum of sales for males vs. females for five product segments. This view shows that females are buying a bit more than males from all product categories. The profile chart below presents an attribute view. It shows seven attributes of each purchaser. Attributes such as "customer age," "accumulated sales," and "number of purchases" are presented, giving each purchaser a "profile". In FIG. 17, the continuous variable "receipt average" has been modified to exclude all smaller values (small purchases) using a receipt average attribute control 74. The aggregate view in the bar chart is recalculated to show that most large purchases are made by females of furniture and garden products. At the same time, the attribute view in the profile chart is updated to show the customers that made those purchases and their overall attribute profiles.

The system presents a single interface that allows the user to analyze data by dimension, by attribute, and by dynamic filtering at the same time. In this regard, it should preferably allow the user to change the ranges (or lists of items) of the columns of data that then drive the dimensional (aggregated) and attribute-based visualizations, in real time. A real-time response is one that is immediate and direct, and preferably takes less than 100 milliseconds, but the user should still experience good performance with a response time of up to about one second, however, and systems can still be workable at even longer response times. The intuitive and responsive nature of the system is also enhanced by the use of graphical controls instead of textual controls, although textual controls can be provided as simultaneously available optional alternatives to graphical controls.

It should be noted that the system is persistent in its exploration of data. Adjusting a query device or other control adjusts the state of the analysis and leaves it in this state for the next adjustment. This is different from some prior art database systems that allow manual, textual queries into dimensional and attribute data but do not persist a visual result of these queries for further exploration.

The system can also enhance its display of information through the use of automatic bar dropping and auto-zooming capabilities. Automatic bar dropping automatically skips bars with no data in a bar graph. Auto-zooming automatically resizes a plot to fit the non-zero parts of a selected range within a window.

The illustrative system described above is based on a data visualization product. But functionality according to the invention could also be incorporated into other types of products, such as statistical analysis packages, spreadsheets, databases, reporting systems, or OLAP systems and their variants (MOLAP, ROLAP, etc.). Functionality according to the invention may also be embedded as a part of other types of products, such as cell phones, PDAs, or automotive dashboard displays, to present analysis views of variables of interest to the user, such as network availability, traffic patterns, or status of product subsystems.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A computer-based system comprising a processor and a storage device including instructions that are operative to run on the processor for analyzing data from a data set, comprising:
   a presentation selection control operative to select a first presentation format and a second presentation format from a plurality of different presentation formats,
   presentation logic operative to simultaneously present a dimensional data presentation to a user using the first presentation format and a attribute data presentation to a user using the second presentation format,
   a dimensional analysis control responsive to user input to navigate dimensionally organized data fields in the data set according to its dimensional organization in the dimensional data presentation,
   an attribute analysis control responsive to user input to analyze the same dimensionally organized data fields in the data set according to its attributes in the attribute data presentation, wherein the dimensional analysis control and the attribute analysis control include at least one control responsive to position-based user interaction, and
   interactive analysis logic that is responsive to the dimensional analysis control and to the attribute analysis control for the same dimensionally organized data fields, and is responsive to user input via the dimensional data analysis control to update the attribute data presentation and to user input via the attribute analysis control to update the dimensional data presentation, wherein the interactive analysis logic remains responsive to further user input via the dimensional data analysis control and to further user input via the attribute analysis control to further update the presentations.

2. The system of claim 1 wherein user input via the dimensional analysis control causes the dimensional analysis control to transition between one of at least three states, wherein user input via the attribute analysis control causes the attribute analysis control to transition between one of at least three states, and wherein each state transition generates one of a series of different successive queries to the data set.

3. The system of claim 1 further including aggregation measure control logic operative to aggregate data sets defined using the dimensional control according to different aggregation measures.

4. The system of claim 1 wherein a same type of control can be used for dimensionally organized data and non-dimensionally organized data.

5. The system of claim 1 wherein the dimensional analysis control is substantially continuously adjustable.

6. The system of claim 1 wherein the dimensional analysis control and the attribute analysis control are responsive to actuation by a same pointing device.

7. The system of claim 1 wherein the dimensional analysis control includes a slider.

8. The system of claim 1 wherein the dimensional analysis control includes a filter control.

9. The system of claim 8 wherein the dimensional analysis control includes a hierarchically organized filter control.

10. The system of claim 1 wherein the dimensional analysis control includes a tree-based control.

11. The system of claim 1 wherein the dimensional analysis control for one dimension and a further dimensional access control for another dimension are associated with the same visualization.

12. The system of claim 1 wherein the system includes logic operative to recognize dimensional organization in the data set.

13. The system of claim 1 wherein the system includes dimension input logic operative to retrieve external stored dimensions for the data set.

14. The system of claim 1 wherein the system includes dimension input logic operative to retrieve external stored dimensions for the data set from local storage.

15. The system of claim 1 wherein the system includes dimension input logic operative to retrieve external stored dimensions for the data set from an external system.

16. The system of claim 1 wherein dimensional and attribute information is stored in a centrally managed model that can be shared among many users.

17. The system of claim 1 wherein the dimensionally organized data are organized according to a hierarchy.

18. The system of claim 17 wherein the system includes stored logic to handle predetermined types of hierarchies.

19. The system of claim 17 wherein the system includes stored logic to handle a plurality of the following types of hierarchies: time-based hierarchies, money-based hierarchies, and distance-based hierarchies.

20. The system of claim 1 wherein the data analysis system includes spreadsheet functionality.

21. The system of claim 1 wherein the data analysis system includes interactive data visualization logic operative to include graphical visualizations in the data presentation.

22. The system of claim 1 wherein the data analysis system is a statistical package that includes a plurality of advanced statistical functions.

23. The system of claim 1 wherein the data analysis system is an OLAP system and wherein the dimensional analysis control is an OLAP control.

24. The system of claim 1 wherein the data analysis system is a reporting system.

25. The system of claim 1 wherein the data set is accessed from a commercial relational database.

26. The system of claim 25 wherein the data analysis system is built into the commercial relational database.

27. The system of claim 1 wherein the data analysis system is built into a larger product and provides one or more data analysis views that relate to the functions of the larger product.

28. The system of claim 1 wherein a plurality of further analysis controls is available to the user.

29. The system of claim 1, further including a dimension assignment control responsive to input from a user to assign dimensions for a dimensional organization for the data set.

30. The system of claim 29 wherein the dimension assignment control is operative to assign new dimensions that are different from any dimensions defined by a dimensional structure of the data set.

31. The system of claim 1 wherein the interactive analysis logic is operative to simultaneously update the state of both the attribute data presentation and the dimensional data presentation in response to input from either the attribute analysis control or the dimensional analysis control.

32. The system of claim 1 wherein the dimensional analysis control includes a portion of the data presentation that is responsive to user actuation.

33. The system of claim 1 wherein the dimensional analysis control includes a field selector.

34. The system of claim 1 wherein the attribute analysis control includes a portion of the data presentation that is responsive to user actuation.

35. The system of claim 1 wherein the data set and its attributes are stored in one database, and dimensions are stored in another database.

36. The system of claim 1 wherein the data set and its attributes and dimensions are stored in a cache.

37. A method for analyzing data from a data set, comprising:
receiving a selection of a first one of a plurality of different presentation formats,
receiving a selection of a second one of the plurality of different presentation formats,
simultaneously presenting a dimensional data presentation to a user using the first presentation format and an attribute data presentation to the user using the second presentation format,
receiving at least one attribute analysis command from a user to analyze the data in the dimensionally organized data set according to its attributes,
updating the state of both the attribute data presentation and the dimensional data presentation in response to the attribute analysis command received in the step of receiving an attribute analysis command,
receiving at least one dimensional analysis command from a user to navigate dimensionally organized data in the data set according to its dimensional organization,
updating the state of the dimensional data presentation and the attribute data presentation in response to the dimensional analysis command received in the step of receiving a dimensional analysis command,
remaining responsive to further attribute analysis commands and to further dimensional analysis commands to further update the presentations after each of the steps of updating, and
wherein at least one of the attribute analysis command and the dimensional analysis command is based on position-based interaction.

38. The method of claim 37 wherein the step of updating takes less than one second.

39. The method of claim 37 wherein the graphical attribute analysis command and the graphical dimensional analysis command are received from a pointing device.

40. The method of claim 37 wherein parameters of the dimensional analysis command are responsive to changes in data selection based on the attribute analysis command.

41. The method of claim 37 wherein parameters of the attribute analysis command are responsive to navigation through hierarchies based on the dimensional command.

42. The method of claim 37 further including receiving an aggregation measure command and changing an aggregation measure for the data set based on the aggregation measure command.

43. The method of claim 37 wherein the dimensionally organized data are organized according to a hierarchy.

44. The method of claim 37 wherein a same data subset can be treated as an attribute or a dimension.

45. A computer-based system comprising a processor and a storage device including instructions that are operative to run on the processor for analyzing data from a data set, comprising:
means for receiving a selection of a first presentation format and a second presentation format from a plurality of different presentation formats,
means for simultaneously presenting a dimensional data presentation to a user using the first presentation format and an attribute data presentation to the user using the second presentation format,
means for receiving attribute analysis commands from a user to analyze the data in the data set according to its attributes,
means for updating the state of both the attribute data presentation and the dimensional data presentation in response to the attribute analysis command received by the means for receiving an attribute analysis command,
means for receiving dimensional analysis commands from a user to navigate dimensionally organized data in the data set according to its dimensional organization,
means for updating both the state of the dimensional data presentation and the attribute data presentation in response to the dimensional analysis command received by the means for receiving a dimensional analysis command,
means for remaining responsive to further graphical attribute analysis commands and to further graphical dimensional analysis commands to further update the presentations, and
wherein at least one of the means for receiving an attribute analysis command and the means for receiving a dimensional analysis command is responsive to position-based user input.

\* \* \* \* \*